United States Patent
Daniel

(10) Patent No.: US 7,620,235 B2
(45) Date of Patent: Nov. 17, 2009

(54) DEVICE FOR SCANNING THREE-DIMENSIONAL OBJECTS

(75) Inventor: Ron Daniel, Oxford (GB)

(73) Assignee: Isis Innovation Ltd., Summertown, Oxford (GB)

( * ) Notice: Subject to any disclaimer, the term of this patent is extended or adjusted under 35 U.S.C. 154(b) by 288 days.

(21) Appl. No.: 10/575,775

(22) PCT Filed: Sep. 28, 2004

(86) PCT No.: PCT/GB2004/004135

§ 371 (c)(1),
(2), (4) Date: Mar. 20, 2007

(87) PCT Pub. No.: WO2005/040850

PCT Pub. Date: May 6, 2005

(65) Prior Publication Data

US 2007/0273687 A1 Nov. 29, 2007

(30) Foreign Application Priority Data

Oct. 15, 2003 (GB) ................................. 0324179.1

(51) Int. Cl.
*G06K 9/00* (2006.01)
(52) U.S. Cl. ................. 382/154; 382/103; 356/394; 345/426
(58) Field of Classification Search ............... 382/103, 382/206, 203, 291, 218, 199, 217, 144, 154; 356/394, 622, 607; 353/122, 28; 378/8, 378/16, 108; 250/234, 559.24, 559.06, 559.22, 250/559.19; 701/209; 345/420
See application file for complete search history.

(56) References Cited

U.S. PATENT DOCUMENTS 4,794,262 A * 12/1988 Sato et al. ............... 250/559.22
5,307,153 A 4/1994 Kanda et al.

(Continued)

FOREIGN PATENT DOCUMENTS

EP 0 391 531 10/1990

OTHER PUBLICATIONS

C. Rocchini, et al., *A Low Cost 3D Scanner Based on Structured Light*, Eurographics 2001, vol. 20, No. 3.

(Continued)

*Primary Examiner*—Sheela C Chawan
(74) *Attorney, Agent, or Firm*—Thomas, Kayden, Horstemeyer & Risley, LLP; Todd Deveau

(57) ABSTRACT

A scanning system and method for constructing a three-dimensional model of an object, the scanning system comprising: a scanning device (2) and a scanning template member (4). The scanning device (2) has an emitter (20) for projecting light and a sensor (22) for capturing images, the emitter and the sensor being, in use, in a fixed position relative to each other. The scanning to template member (4) has a known two-dimensional template (42). Processing means generates data to enable construction of a three-dimensional model of an object (8) placed between the scanning device (2) and the scanning template (42), the processing means being arranged, when in use, to generate information about the object (8) relative to the scanning template (42), this information being generated from the same image onto which the projected light is projected by the emitter. Both measurements are made relative to the same reference plane.

6 Claims, 2 Drawing Sheets

U.S. PATENT DOCUMENTS

| | | | |
|---|---|---|---|
| 5,848,188 A * | 12/1998 | Shibata et al. | 382/203 |
| 5,920,395 A * | 7/1999 | Schulz | 356/622 |
| 6,373,557 B1 * | 4/2002 | Mengel et al. | 356/4.07 |
| 6,493,095 B1 | 12/2002 | Beauchamp et al. | |
| 6,590,640 B1 * | 7/2003 | Aiken et al. | 356/3.01 |
| 7,149,010 B2 * | 12/2006 | Tecu et al. | 358/487 |
| 2003/0038822 A1 * | 2/2003 | Raskar | 345/632 |
| 2004/0223663 A1 * | 11/2004 | Cato | 382/318 |

OTHER PUBLICATIONS

Chu, et al., *Calibration-Free Approach to 3D Reconstruction Using Light Stripe Projections on a Cube Frame*, Proceedings of the Third International Conference on 3D Digital Imaging and Modelling 2001.

* cited by examiner

DEVICE FOR SCANNING THREE-DIMENSIONAL OBJECTS

CROSS REFERENCE TO RELATED APPLICATION

This application claims priority to and the benefit of GB 0324179.1 dated 15 Oct. 2003 and PCT/GB 2004/004135 filed 28 Sep. 2004.

FIELD OF THE INVENTION

The invention relates to scanning devices and in particular to a method and a scanning device suitable for scanning three-dimensional objects to enable reconstruction of a 3D model of a real object.

BACKGROUND OF THE ART

The approaches described herein as background could be pursued, but are not necessarily approaches that have been previously conceived or pursued. Therefore, unless otherwise indicated herein, the approaches described as background are not prior art to the claims in this application and are not admitted to be prior art by inclusion herein.

Three-dimensional scanning devices generally involve a two stage process of data capture followed by the reconstruction of a 3D image. Data capture involves the collection of raw data which is used to generate the initial geometry of the object being scanned. Typical examples of the data capture process involve contact techniques (e.g. a mechanical probe tracking the surface of an object) and non-contact techniques (such as imaging and range finding techniques). In reconstruction, this data is processed into data suitable for 3D Computer Aided Design (CAD) and/or animation applications.

One such non-contact technique comprises optical technology in which a structured pattern of light is projected onto an object. "A low cost 3D scanner based on structured light", by C. Rocchini et al in Eurographics 2001, Volume 20, Number 3, describes a technique based on structured light using a non-contact optical scanning technique. A structured pattern of light is projected on to an object and a sensor acquires images of the distorted pattern of light on the surface of the object. Depth information is then reconstructed by triangulation between the sensor, the emitter and the sampled point. Such a technique requires a high degree of accuracy in particular between the monitored positions of the emitter, sensor and a sampled point so that the depth information can be accurately reconstructed. Such techniques require sophisticated devices and calibration each time they are used.

"Calibration-Free Approach to 3D Reconstruction using Light Stripe Projections on a Cube Frame" by Chu et al, Proceedings of the Third International Conference on 3D Digital Imaging and Modelling 2001 describes an example of a system in which a light plane projector projects light onto an object inside a three-dimensional frame. The three-dimensional frame includes a plurality of Light Emitting Diodes (LEDs) which are provided on the corners of the frame. A user waves a laser striper across the object. A sensor in the form of a camera acquires images of the distorted projected pattern of light as reflected from the frame and the surface of the object within the frame. The captured images also include images of the LEDs, which allow the sensor to detect the cube frame.

The camera as used in the implementation described by Chu et al requires no intrinsic calibration. However care has to be taken to fabricate an accurate cube frame and complex image processing is required. In addition the cube frame can cause occlusion of the object. More specifically, shadows can occur at the edges of the cube, which reduces the precision with which edges can be detected to only within a few pixels. Thus the image of the cube is very unlikely to be a cube, and robust statistics must be used to find the image features.

Based on the foregoing, there is a clear need for a scanner device that achieves the required degree of accuracy without requiring complex processing steps or complex reference frames.

SUMMARY

The needs identified above, and other needs and objects that will become apparent from the following description, are achieved via a scanning system for constructing a three-dimensional model of an object, which comprises in one aspect, a scanning device having an emitter for projecting light and a sensor for capturing images, the emitter and the sensor being, in use, in a fixed position relative to each other, and a scanning template member having a known two-dimensional template. Processing means generate data to enable construction of a three-dimensional model of an object placed between the scanning device and the scanning template. The processing means, in use, generates information about the object relative to the scanning template, this information being generated from the same image onto which the projected light is projected by the emitter.

BRIEF DESCRIPTION OF THE DRAWINGS

The present invention is illustrated by way of example only and not by way of limitation in the figures of the accompanying drawings in which.

DETAILED DESCRIPTION

A method and apparatus for scanning a 3D object are described. In the following description, for the purposes of explanation, numerous specific details are set forth to provide a thorough understanding of the present invention. It will be apparent however to one skilled in the art that the present invention may be practised without these specific details. In other instances, well known structures and devices are shown in block diagram form in order to avoid unnecessarily obscuring the present invention.

Figure 1:
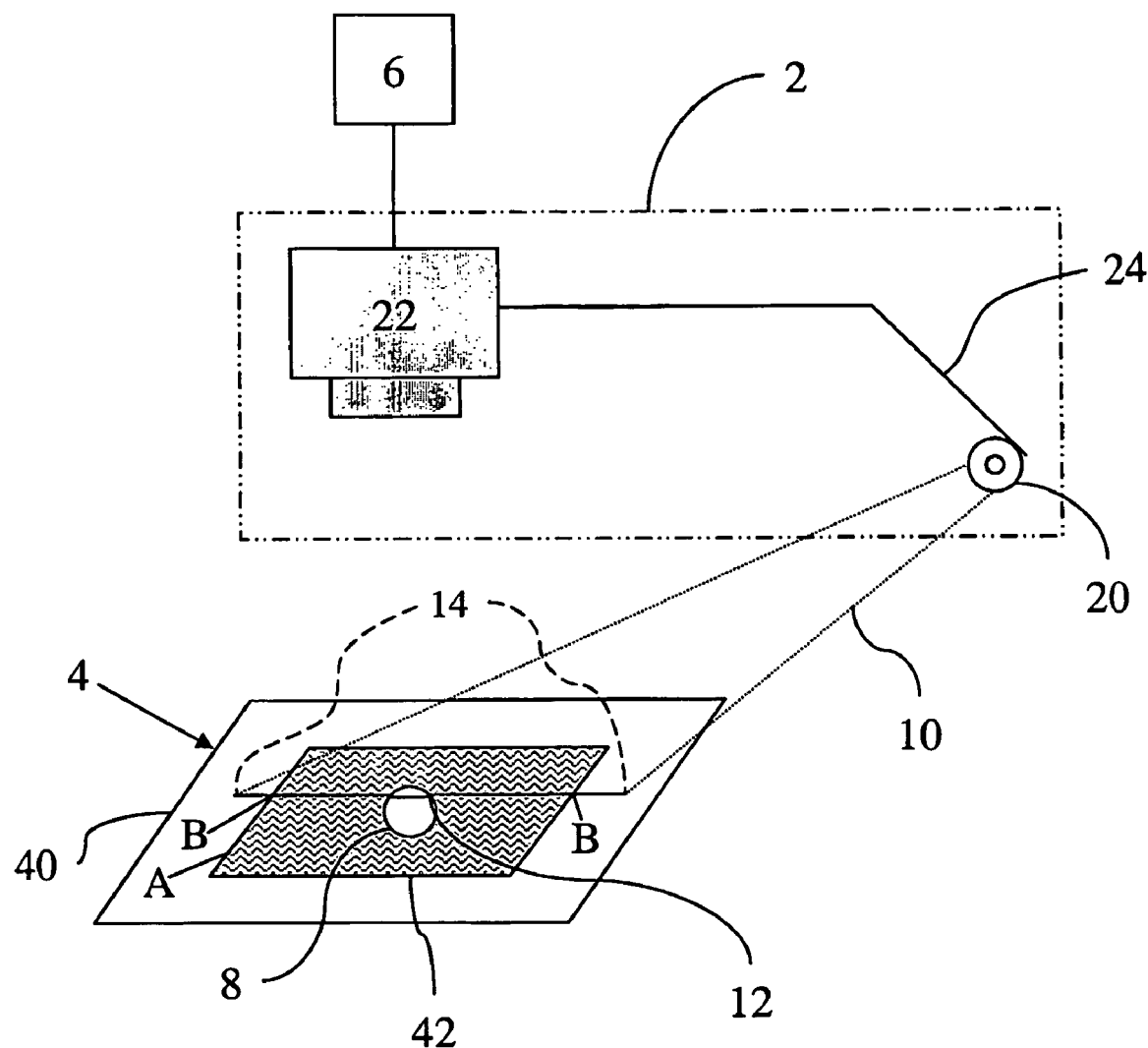
FIG. 1 is a schematic diagram of one embodiment of a scanning system.

FIG. 1 shows an embodiment of a scanning system. The scanning system comprises a scanning device 2, a scanning template member 4 and scanning software which may be stored in the scanning device 2 or in a separate processing device 6 to which the scanning device 2 is connected. The processing device 6 is typically a Personal Computer PC. The software includes details of the scanning template 4.

The scanning device 2 has an emitter 20 and a sensor 22. The positional relationship between the emitter 20 and the sensor 22 is known to a rough approximation, which provides an input "seed" for the calculation algorithm. This positional relationship is fixed during a scan. For instance, when not in use the emitter 20 and the sensor 22 may be stowed away and in use moved relative to each other to a known relative position. Additionally or alternatively, the emitter and the sensor may be moveable between a plurality of fixed positions. In the embodiment shown in FIG. 1, the emitter 20 is fixed to the sensor 22 by an arm 24. The emitter 20 and the sensor 22 have a fixed position relative to each other, which is controllable by the arm 24.

The emitter is typically a laser pointer and may include means for structuring the light projected from the laser. For best results, the light projected by the emitter 20 needs to be thin and straight and form a plane of light which, in use, is incident on the object to be scanned. The sensor is an image capture device, for instance a CCD device such as a digital camera. Typically the size of the scanning device is such that it is suitable for hand held application. Alternatively the scanning device 2 may be mounted, for instance on a pedestal tripod or the like.

The scanning template member 4 has a two-dimensional planar surface 40 which has printed thereon a two-dimensional template 42 of known shape and size. As shown in FIG. 1, the object 8 to be scanned is placed on the scanning template 42 of the 2-dimensional scanning template member 4 such that the object 8 is positioned between the scanning device 2 and the scanning template 42. In FIG. 1 the scanning template 42 is shown as a rectangle printed onto a plain planar rectangular surface 40, such as a piece of paper. Other shapes of scanning template may be used.

The scanning template member may be generated by a user, for instance by a user instructing the PC 6 to print a scanning template 42 onto a planar surface, such as a piece of paper or card. The user may also be able to select the colour of the scanning template 42 so that it contrasts with the object to be scanned. In all cases, the details of the scanning template generated or provided are stored for access for further processing.

In the scanning system described, the absolute position of the scanning device 2 with respect to the object 8 is not needed as the sensor 22 will generate information about the object 8 relative to the plane of the scanning template 42. This information is generated from the same image onto which the projected pattern of light is projected by the emitter 20 which is fixed in position relative to the sensor 22. The position of the stripe of light on the object 8 is also known with respect to the image of the stripe and with respect to the plane of the scanning template 42.

The image captured by the sensor 22 includes an image of the scanning template 42 and provides a good estimate of the position of the sensor 22 with respect to the object 8. The scanning system is also programmed with details of the structured pattern of light to be emitted by the emitter 20. The image 12 of the reference stripe from the emitter 20 is provided on the surface of the scanning template plane 42 as well as the object 8. Thus the position of reference stripe 12 with respect to the plane of the scanning template 42 is known extremely accurately and far in excess of the accuracy of the calibration of the sensor 22.

Where the reference stripe 12 crosses the scanning template plane 42, this is referred to as the disparity zone 14, and it is the position of the reference stripe 12 in the disparity zone 14 that gives us the position of the surface of the object.

Such an embodiment replaces absolute accuracy with a system in which all first order errors cancel (even those in the sensor) as all measurements are made relative to the same planar reference.

To use the scanner, first of all the camera requires calibration. This may be achieved by using a least-squares algorithm and preferably a recursive least-squares algorithm. The camera is calibrated by the user taking a number of images of a calibration pattern printed by the user's printer. Methods for calibrating cameras based on such planar images are well known and appear in the open literature, as exemplified by J. Y. Bouguet's "Camera Calibration Toolbox for Matlab", found on http:www.vision.Caltech.edu/bouguetj/calib_doc/index.html.

In a preferred embodiment of the invention, a user inputs to the system an indication of the approximate size of the object to be scanned, but this step is not necessary for the correct effect to be achieved. In addition, several variations exist that provide a convenient mechanism to automate the input of a size estimate, such as the provision of several scanning templates of different sizes and shapes, with the user selecting the one which best matches the size of the object to be scanned. By placing a unique identifying pattern on the edge of each different scanning template, the scanner and processor can then be configured to identify which size of template was selected by the user, concurrent with scanning the test object. This in turn automatically provides the input of estimated object size. Several variations of this approach exist that would readily be devised by one familiar with instrument software design.

Figure 2:
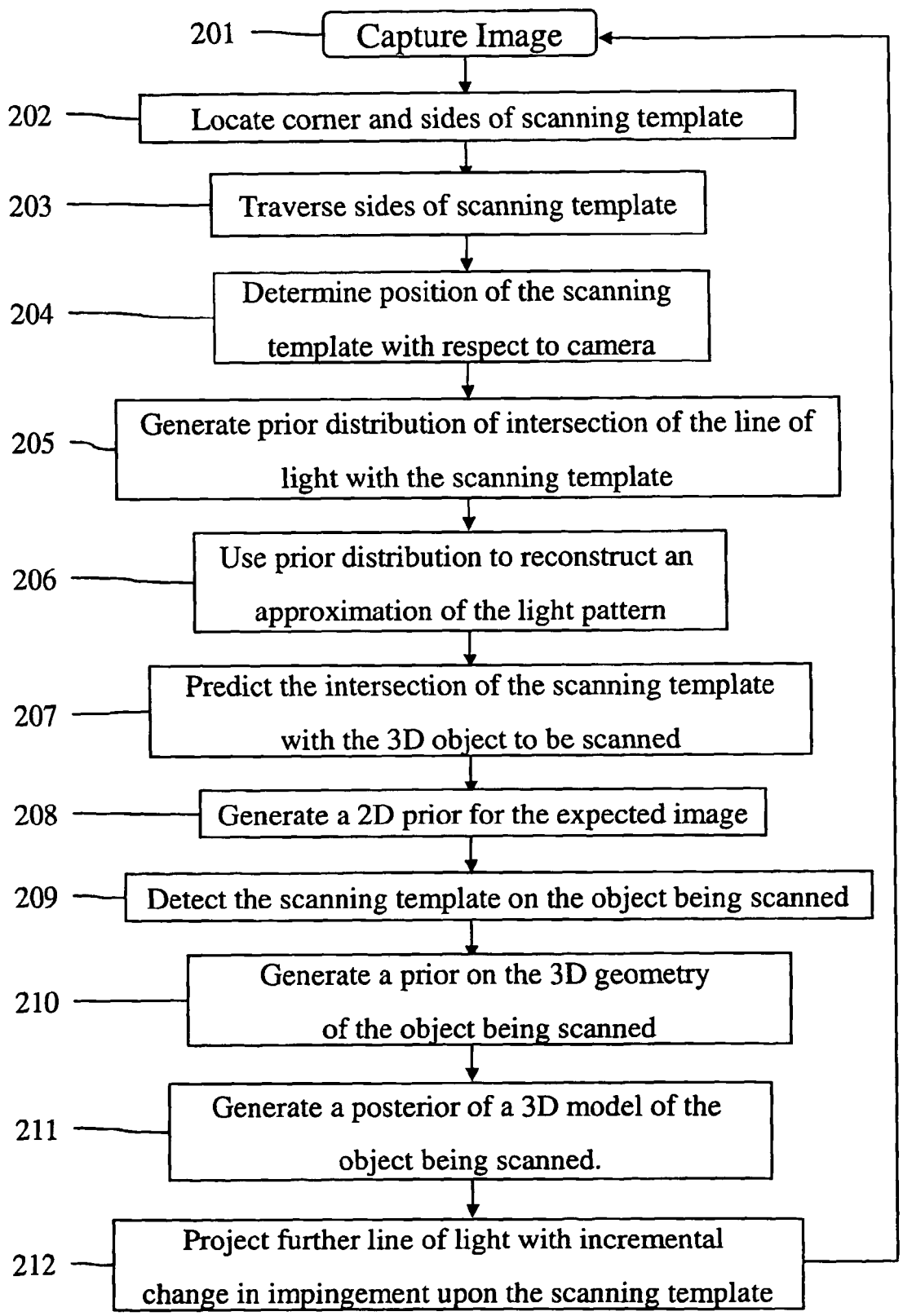
FIG. 2 is a flow diagram that illustrates the operation of an embodiment of the scanning device.

Further details of how the scanning system operates will now be described with reference to FIG. 2. The emitter 20 projects light 10 onto the object 8 and the scanning template member 4. The sensor 22 receives a captured image (201) which includes the image of the reference stripe 12 projected onto the surface 40 of the scanning template member 4 and, within the disparity zone 14, the intersection of the light with the object 8. In response, the processor, which is programmed with details of the shape of the scanning template 42, locates (202) a part of the scanning template, for instance the processor finds the corners of the scanning template 42. The processor then uses a convolution operator to find the sides of the scanning template 42. To achieve this, the system traverses (203) the sides of the scanning template 42 using a forwards-backwards adaptive extended Kalman Filter.

Once the processor has located the sides of the scanning template 42, the position of the scanning template relative to the scanning device is known to the processor since the processor has knowledge of the shape and dimensions of the scanning template. The system therefore determines (204) the position of the scanning template with respect to the camera and generates statistics of said position. The sensor does not need to be perpendicular to the scanning template plane in order to work, since all the geometry upon which the invention is based uses skew lines.

The system then generates (205) prior distribution of the intersection of the reference stripe 12 with the plane of the scanning template 42 using an approximate model of the light pattern and the statistics as previously generated. The processor locates the projected reference stripe 12 in the image by processing the image along the side of the scanning template. For instance, say that the processor starts from the bottom left-hand corner of scanning template 42 as shown in FIG. 1 and proceeds along side A of the scanning template. An edge detector algorithm may be used to identify the point B of the reference stripe 12 that crosses the side A of the scanning template. Once this point B is found on each side of the scanning template 42, the processor searches along the line B-B within the disparity zone 14, looking for discontinuities in the reference stripe 12. The processor then estimates the thickness of the object 8 that is being imaged by approximating the line.

The prior distribution of step 205 is used to drive a Bayesian filter (206) to reconstruct an Affine approximation to the light pattern on the scanning plane outside the scanning template 42. The Affine approximation to the scanning pattern is then used (207) to predict the intersection of the scanning template 42 with the 3D object to be scanned.

A 2D prior is then generated projectively (208) for the expected image using step 207 based on any previous scans, or if the first scan, with bounds placed on the expected image location. The prior for the intersection of the structured light pattern with the object to be scanned is then used (209) as a template for an adaptive 2D extended Kalman filter, to detect the structured light pattern on the object being scanned.

The statistics of the posterior generated by the Kalman filter in step 209 are then used (210) to generate a prior on the 3D geometry of the object being scanned. The prior on object geometry is then updated (211) using a Bayesian update rule to generate a posterior of a 3D model of the object being scanned, ready for the next image capture.

These steps are then repeated (212) for a range of lines of light projected with incremental changes in impingement upon the scanning template, until the whole of the object on the scanning template 42 has been scanned. The data generated may then be processed for provision to a modelling application, such as a conventional 3D CAD or animation application or the like As used herein, 'prior' is short for 'prior distribution' and posterior is short for 'posterior distribution'. The prior is a probabilistic description of the state of knowledge before a measurement and the posterior is the state of knowledge after the measurement. Generally one goes from the prior to the posterior using Bayes' rule.

Thus there is provided a calibrated scanning device which is calibrated off-line using an algorithm that uses parameters known to and characteristic of the system (so-called "intrinsic parameters"). The "extrinsic parameters" of the sensor, i.e. those variables which are not intrinsically fixed within the design of the sensor (for example the position of the object), are estimated in use using a scanning template of known shape and size, which may be generated by a user.

The scanner described may be used for many purposes, for instance for home use (e.g. scanning a favourite item such as an ornament or a piece of jewelry), in the games entertainment field (for instance for scanning and reconstructing a figure for subsequent animation), for academic use (for instance for scanning antiquities), to medical uses. The examples given here are for example only and are not intended to be limiting.

The skilled person will appreciate that modification of the disclosed arrangement is possible without departing from the invention. Accordingly, the above description of several embodiments is made by way of example and not for the purposes of limitation. It will be clear to the skilled person that minor modifications can be made to the arrangements without significant changes to the operation described above. The present invention is intended to be limited only by the scope of the following claims.

The invention claimed is:

1. A scanning system for constructing a three-dimensional model of an object, the scanning system comprising:
    a scanning device having an emitter for projecting light and a sensor for capturing images, the emitter and the sensor being, in use, in a fixed position relative to each other;
    a scanning template member having a known two-dimensional template;
    processing means to generate data to enable construction of a three-dimensional model of an object placed between the scanning device and the scanning template, the processing means being arranged, when in use, to generate information about the object relative to the scanning template, this information being generated from the same image onto which the projected light is projected by the emitter.

2. A scanning system as claimed in claim 1 wherein the processing means is arranged to carry out the following steps on an image captured by the sensor:
    to locate in the image at least one part of the scanning template,
    to locate on the scanning template plane a line of light which is the intersection of a plane of light projected by the emitter and the scanning template plane; and
    to move along the line of light and identify one or more disparities in the line of light.

3. A scanning system as claimed in claim 2 wherein multiple lines of light are used to accelerate the scanning process.

4. A scanning method for constructing a three-dimensional model of an object, the method comprising:
    placing an object to be scanned between a scanning device and a scanning template having a known two-dimensional template;
    scanning an object using a scanning device having an emitter for projecting light and a sensor for capturing images, the emitter and the sensor being, in use, in a fixed position relative to each other;
    generating information about the object relative to the scanning template, this information being generated from the same image onto which the projected light is projected by the emitter, to generate data to enable construction of a three-dimensional model of the object.

5. A scanning method as claimed in claim 4 further comprising carrying out the following steps on an image captured by the sensor:
    locating in the image at least one part of the scanning template,
    locating on the scanning template a reference line of light projected by the emitter; and
    moving along the line of light and identifying the disparities in the line of light.

6. A scanning method as claimed in claim 5 wherein a multiplicity of lines of light are used.

* * * * *

UNITED STATES PATENT AND TRADEMARK OFFICE
CERTIFICATE OF CORRECTION

PATENT NO.      : 7,620,235 B2　　　　　　　　　　　　　　　　　　　　Page 1 of 1
APPLICATION NO. : 10/575775
DATED           : November 17, 2009
INVENTOR(S)     : Ron Daniel It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 502 days.

Signed and Sealed this

Twenty-sixth Day of October, 2010

David J. Kappos
*Director of the United States Patent and Trademark Office*